US007406596B2

(12) United States Patent
Tararoukhine et al.

(10) Patent No.: US 7,406,596 B2
(45) Date of Patent: Jul. 29, 2008

(54) DATA TRANSFER AND MANAGEMENT SYSTEM

(75) Inventors: Ilia Valerievich Tararoukhine, deceased, late of Moscow (RU); by Maria Iosifovna Tararukhina, legal representative, Moscow (RU); by Danil Iliich Tararukhin, legal representative, Moscow (RU); Andrei Igorevich Roumiantsev, Reutov (RU); Alexandre Vladimirovich Koltsov, Troitsk (RU); Brian John O'Doherty, Dublin (IE)

(73) Assignee: Herbert Street Technologies, Dublin (IE)

( * ) Notice: Subject to any disclaimer, the term of this patent is extended or adjusted under 35 U.S.C. 154(b) by 786 days.

(21) Appl. No.: 10/221,221

(22) PCT Filed: Mar. 12, 2001

(86) PCT No.: PCT/IE01/00033

§ 371 (c)(1),
(2), (4) Date: Sep. 10, 2002

(87) PCT Pub. No.: WO01/67705

PCT Pub. Date: Sep. 13, 2001

(65) Prior Publication Data

US 2003/0177422 A1    Sep. 18, 2003

(30) Foreign Application Priority Data

Mar. 10, 2000   (IE)   ............................. S2000/0191

(51) Int. Cl.
*H04L 9/00*    (2006.01)

(52) U.S. Cl. ....................................... 713/165; 726/26

(58) Field of Classification Search ................... 726/26; 713/165

See application file for complete search history.

(56) References Cited

U.S. PATENT DOCUMENTS

| 5,297,208 | A | * | 3/1994 | Schlafly et al. | ............. 380/261 |
| 5,495,533 | A | * | 2/1996 | Linehan et al. | ............. 713/155 |
| 5,590,266 | A | * | 12/1996 | Carson et al. | ............... 715/741 |
| 5,692,124 | A | * | 11/1997 | Holden et al. | .................. 726/2 |
| 5,748,735 | A | * | 5/1998 | Ganesan | ....................... 713/165 |
| 5,857,189 | A | * | 1/1999 | Riddle | .......................... 707/10 |

(Continued)

OTHER PUBLICATIONS

Cliff Berg, How Do I Transfer Data Securely?, Feb. 1998, XP-000937440, pp. 119-121.*

(Continued)

*Primary Examiner*—Nasser Moazzami
*Assistant Examiner*—David Garcia Cervetti
(74) *Attorney, Agent, or Firm*—Birch, Stewart, Kolasch & Birch, LLP

(57) ABSTRACT

A system for the secure transfer of data and data management on the Internet has a data encryption and transfer module operable in a user computing system, a data management module operable in a sewer computing system, the transfer of data between the user and the server computing systems being effected on the user computing system through use of the data encryption and transfer module, by moving the data to or from a first desktop window, associated with the user computing system, from or to a second desktop window, associated with the server computing system, each window being associated with a password, such that the step of moving the data from one window to the other causes the data to encrypted/re-encrypted from one associated password to the other.

38 Claims, 6 Drawing Sheets

U.S. PATENT DOCUMENTS

| | | | | |
|---|---|---|---|---|
| 5,940,591 | A * | 8/1999 | Boyle et al. | 726/3 |
| 6,023,506 | A * | 2/2000 | Ote et al. | 713/165 |
| 6,108,425 | A * | 8/2000 | Smith et al. | 380/277 |
| 6,173,402 | B1 * | 1/2001 | Chapman | 713/182 |
| 6,219,669 | B1 * | 4/2001 | Haff et al. | 707/10 |
| 6,314,425 | B1 * | 11/2001 | Serbinis et al. | 707/10 |
| 6,378,071 | B1 * | 4/2002 | Sasaki et al. | 713/165 |
| 6,415,318 | B1 * | 7/2002 | Aggarwal et al. | 709/206 |
| 6,442,571 | B1 * | 8/2002 | Haff et al. | 707/201 |
| 6,463,418 | B1 * | 10/2002 | Todd | 705/26 |
| 6,584,466 | B1 * | 6/2003 | Serbinis et al. | 707/10 |
| 6,615,349 | B1 * | 9/2003 | Hair | 713/165 |
| 6,671,757 | B1 * | 12/2003 | Multer et al. | 710/100 |
| 6,718,361 | B1 * | 4/2004 | Basani et al. | 709/201 |
| 6,938,042 | B2 * | 8/2005 | Aboulhosn et al. | 707/10 |
| 7,013,392 | B1 * | 3/2006 | Sasaki et al. | 713/187 |
| 7,058,648 | B1 * | 6/2006 | Lightfoot et al. | 707/102 |
| 7,076,633 | B2 * | 7/2006 | Tormasov et al. | 711/203 |
| 7,124,164 | B1 * | 10/2006 | Chemtob | 709/204 |
| 7,136,903 | B1 * | 11/2006 | Phillips et al. | 709/217 |
| 7,171,557 | B2 * | 1/2007 | Kallahalla et al. | 713/165 |
| 7,200,747 | B2 * | 4/2007 | Riedel et al. | 713/165 |
| 7,203,317 | B2 * | 4/2007 | Kallahalla et al. | 380/278 |
| 7,233,997 | B1 * | 6/2007 | Leveridge et al. | 709/229 |
| 7,263,528 | B2 * | 8/2007 | Haff et al. | 707/102 |
| 2002/0019932 | A1 * | 2/2002 | Toh et al. | 713/155 |
| 2002/0049853 | A1 * | 4/2002 | Chu et al. | 709/237 |
| 2002/0099735 | A1 * | 7/2002 | Schroeder et al. | 707/513 |
| 2002/0143906 | A1 * | 10/2002 | Tormasov et al. | 709/220 |
| 2003/0046366 | A1 * | 3/2003 | Pardikar et al. | 709/219 |
| 2004/0068524 | A1 * | 4/2004 | Aboulhosn et al. | 707/200 |
| 2004/0103280 | A1 * | 5/2004 | Balfanz et al. | 713/169 |

OTHER PUBLICATIONS

Berg, Dr. Dobb's Journal, vol. 23, No. 2, pp. 119-121 (1998).

* cited by examiner

After the client is logged in, through the 2WR technology, he can:

- Upload/ download/ manage files and folders in his PrivateBox
- View/ Download/ delete/ forward IncomingFiles
- View/ Download/ delete IncomingMessages
- Synchronize SK with another client
- Send/upload (automatically archive) files/folders to another client
- Receive email notifications of incoming or delivered data
- Delete/retract previously sent file
- Send/distribute (archived) files/folders to other clients or outside users
- Send message to another client
- Restore uploading/downloading of a file from the point of interruption
- Navigate/browse into any accessible folder (of other client)
- Create/delete/rename CSRoom or edit it's accessibility table
- Synchronize SK of CSRoom with other/new member(s)
- Upload/ download/ manage/ distribute files and folders in/to/from/via his CSRooms
- Upload/ download/ manage/ distribute files and folders in any CSRoom created by other clients (according to the CSR-accessibility table)
- Use the SYSTEM's imbedded PKI, or another PKI (if he already uses one), which the SYSTEM supports (digital signatures, certificates)
- Change client's options/configuration, enable list of e-mails for data distribution, increase/change disk space
- Create outside client/user
- Read log-protocol

Fig. 2b

The Recipient:

Connects to the data management module via his data encryption and transfer module or standard web browser. In the data encryption and transfer module, his R window becomes open, locating to the Recipient's home folder on the server - \\data management module\Recipient\

↓

Via the menu, the Recipient chooses "View/download Incoming files" and/or navigates/gets into the IncomingFiles\ subfolder, where he can see the Sender\ subfolder (in his R window).

↓

Note. If the Recipient received an e-mail notification with a link to some (new) incoming file, he can click on this link and automatically get into the \\data management module\Recipient\IncomingFiles\Sender\ folder, where the incoming file is (temporarily) stored.

↓

Using the data encryption and transfer module the Recipient moves/copies the selected files or an entire Sender\ subfolder from his R window to L (i.e. downloads them on his local computer). Using a standard web browser, the Recipient selects files (or the entire Sender\ subfolder) and downloads them to his local disk by "File> Copy to disk" command.

↓

(*) In the 2WR technology of the data encryption and transfer module, the Recipient can "on-the-fly" decompress transferring archives and/or decrypt or (re)encrypt downloaded archives/files from/by the SK synchronized with the Sender, or using the Recipient's PrivK. These operations occur on the Recipient's local computer after the downloading of data.

↓

(*) In the 2WR technology of the data encryption and transfer mmodule, if the downloaded files/archives are digitally signed, the electronic signatures are automatically checked during decryption or re-encryption (or also can be checked by separate command)

↓

(*) In the P2P case, the Recipient does not need to do anything more than to connect to the data management module. When he does that, he can automatically get data from many senders.

↓

After downloading of files is completed (if it is not a P2P), the data management module automatically (by option) sends an e-mail notification of delivery to the Sender and, if the downloaded file was not deleted on the server by the Recipient, marks it as "downloaded" (changes its attribute, or name, or location on the server).

Fig. 4b

DATA TRANSFER AND MANAGEMENT SYSTEM

This application is the national phase under 35 U.S.C. § 371 of PCT International Application No. PCT/IE01/00033 which has an International filing date of Mar. 12, 2001, which designated the United States of America.

TECHNICAL FIELD

This invention relates to a data transfer and management system and in particular to a system which provides secure transfer of data and data management on the Internet.

BACKGROUND ART

Due to the explosion in the use of the Internet in recent years, there has been a huge increase in the exchange and storage of electronic data over the Internet. This data comes in files of all types and in messages. Many systems have been designed to provide management functionality for this data, including transfer systems (including e-mail, file transferring systems, etc) and storage systems, including single "owner" or shared storage, as well as providing other functionality such as moving remote files, renaming, etc. In general, it may be allowed that these systems work quite well and are adopted by millions of users, except where the user feels security of his data is an important issue. Many prospective users do not trust the Internet as a place where data can be placed privately and confidentially.

One way of securing data being transferred is by encryption. Many "secure" file transfer systems use e-mail technology (smtp) or web-based (http) e-mail. But, in fact, e-mail is quite unsuitable as a medium for the transfer of large files and this is recognized in many systems, which must limit the file sizes, which their users are allowed to transfer. Typically, the file must be sent as an attachment and is limited to 1-8 megabytes in size, depending on the system used. Sometimes, the systems can only purport to encrypt the message itself, not the attachment, and the attachment must be encrypted by separate freestanding encryption software.

Another problem with e-mail is that e-mail technology requires the addition of extra data to all files attached, typically adding about 40% to file sizes, which of course means extra delay in file transfer and extra storage space required on Internet servers. (For example, sending a 1 megabyte file as an e-mail attachment via Microsoft Outlook resulted in over 2 megabytes of total data transmission, including transfer of technical/control data, more than a 100% increase).

In any case, e-mail does not travel in "real time", it can take minutes, hours or even a day to reach a destination, depending on traffic encountered along the way and on other technical requirements in any of the numerous switches/routers through which a travelling e-mail message must navigate. Also, copies of e-mail messages are routinely taken at these switch points and routinely stored indefinitely, giving rise to fears that they may be susceptible to deciphering by unintended parties at a future time. It commonly happens that the transmission of a large e-mail attachment is interrupted by an e-mail system's administrator, e-mail server manager or telecoms operator, for traffic management reasons, usually automatically by computer decision, and the transmission then must recommence later from the beginning of the message. Occasionally, this happens repeatedly until eventually the message becomes sidetracked and dumped, and therefore never arrives at the desired destination.

Also, while an e-mail message is in transit it is irretrievable by the sender, once it leaves the sender's PC, and is beyond the control of anyone connected with the data, sender or receiver, until it arrives at destination successfully. Many users would feel uncomfortable with that thought if considering sending a vitally important document.

As for web-based e-mail, known as HTML mail, accessible via web-browsers, it suffers the additional disadvantage in that it can be used as a method of carrying out surveillance of recipients and their later correspondents. A web-based e-mail message can easily be imbedded with a tracking device by its sender, so that when the recipient replies to the message, using the "Reply To" button, or forwards the message to a third party, perhaps with another message attached, the original sender receives a secret copy of the forwarded message and all subsequent messages containing the original message as a reference. (This is a weakness of HTML messaging in most of the major e-mail programmes). In other words, systems based on web-based e-mail are unacceptable from a security viewpoint.

When sending data across the Internet most current systems rely exclusively on an intermediate server-based communications system, where the sender and recipient, both clients of the server, transfer their messages through mail servers (if using e-mail technology) or file servers, residing in the system operator's premises or under his control. Typically, files are sent to the recipient's post box on the server, to be later picked up by the recipient. The major problems with this are that servers can become overloaded, especially considering that servers themselves are usually mirrored and backed up/duplicated elsewhere and therefore storage space is usually subject to some limit, and communication bandwidth demand is maximized.

Other providers of Internet-based file management services do not offer a secure, true peer-to-peer (P2P) connection as an option, or if they do, they do not offer a specific security solution and no service other than straight file transfer.

Furthermore, almost all other systems use SSL, or its variants or a similar protocol, such as SSH (or EFTP), for encrypting data between the sender and the server and between the server and the recipient. This is unsatisfactory because a) for many reasons, SSL does not (can not) provide strong encryption; b) SSL encrypts only during transmission and therefore leaves the data in unencrypted form on servers and PCs, where it can be accessed; c) SSL slows down server operations very substantially, including the operations of any intermediate servers (for example if e-mail is used) and therefore transmission and file access times. It is reported that SSL can slow down a server's activity by up to 50 times. To get around this, encryption acceleration hardware can be attached to the server, but, while that rebuilds most of the lost speed, the transfer of the data between the accelerator and the server becomes insecure.

Furthermore, in at least some cases it is probable that the server operator/system provider has access to users' unencrypted data, because of SSL. In any case, a system is badly designed from a security point of view if it decrypts data as it delivers it to the recipient's PC, permitting data to be momentarily unencrypted during an open Internet connection.

SSL uses PKI (public key infrastructure) technology, an encryption system that uses two related encryption keys, one of which is used to decrypt messages encrypted by the other one. This is known as an asymmetric encryption system, as compared to a symmetric system where the encryption and decryption keys are the same. PKI is primarily used as a method of transferring a symmetric system's secret key over the Internet; where there is no other secure way to convey the secret key to a recipient. This is the only benefit of PK systems, which are otherwise less secure and slower, by circa 100 times in the encryption function, than symmetric systems.

A further problem with data encryption in relation to the transfer of data is that normally, if a user wants to share/ transfer some encrypted documents to another user, he will first decrypt the data from the really private (disk) password, which normally protects that data, and then re-encrypt it under a password, which he will share with the recipient. (Otherwise, he must needlessly give away/reveal his regular password to another person, whom he might hardly know, and with whom he might never communicate again). But, even in well established symmetric or PKI encryption technologies one does not find the sort of robustness, speed and efficiency that is required for elegant re-encryption or sharing of encrypted data activity.

Another drawback with systems using PKI encryption technology is that they cannot normally handle the sharing of encrypted files among many users. (Each encrypted file in a shared box would have to contain a copy of its unique symmetric key encrypted by the different public keys of each/all users, and all files would have to be modified again for each additional user).

Some file transfer systems, (i.e. such as HushMail (HushMail is a trade mark) system provided by the Hush Communications USA of Austin, Tex.), can encrypt data on the local desktop rather than on the server. The HushMail system, which uses e-mail technology, uses PKI encryption, but keeps users' keys on its server (though in encrypted form), and then downloads to the user his private key inside an "applet", where the encryption is done, whenever the user needs it. The user must trust that the applet contains no other executable program or other doubtful function, and that his private key is securely managed. The HushMail system does not offer file storage or sharing or other functions.

Most other systems rely exclusively on an intermediate server-based communications system, where the sender and recipient, both clients of the server, transfer their messages through mail servers (if using e-mail technology) or file servers, residing on the system operator's premises or under his control. Typically, files are sent to the recipient's postbox on the server, to be later picked up by the recipient. The major problems with this are that servers can become overloaded, especially considering that servers themselves are usually mirrored and backed up or duplicated elsewhere and therefore storage space is usually subject to some limit, and communication bandwidth demand is maximized.

It is an object of the present invention to overcome the disadvantages of the data management and encryption Internet based systems as hereinbefore described.

DISCLOSURE OF INVENTION

Thus, the invention provides a system for the secure transfer of data and data management on the Internet comprising:
 a data encryption and transfer module operable in a user computing system;
 a data management module operable in a server computing system;
 the transfer of data between the user and server computing systems being effected on the user computing system through use of the data encryption and transfer module, by moving the data to or from a first desktop window, associated with the user computing system, from or to a second desktop window, associated with the server computing system, each window being associated with a password, such that the step of moving the data from one window to the other causes the data to be encrypted, re-encrypted or decrypted from one associated password to the other; and
 a password management module operable in the user computing system for managing the passwords, which are required to be used by a user of the system.

The system in accordance with the invention is directed towards providing an integrated system of Internet-based data management services, linked to desktop operations for security reasons, which operates from a single, small piece of client software, easily downloadable, and easily and securely managed.

The secure transfer of data is achieved by using different windows on the desktop which are associated with different users/passwords, and each movement of data between the windows provides not only file transfer, but also encryption, decryption or (re)encryption from one password to another. Such a system supports the transfer from one password to another (e.g. from the local password to the remote one when uploading). In some cases the data to be transferred has already been encrypted with a local/private password (normally a secret symmetric key), and to transfer the data to a recipient, it is necessary to re-encrypt the data with a remote/shared password (which could be the public key of a recipient). In other cases, it is required to download remote encrypted files and re-encrypt them from the remote/shared password-(maybe a public key) to the local/private password of the recipient. Such operations are easily carried out using the data transfer and management system in accordance with the invention.

Preferably, the data encryption and transfer module uses symmetric key encryption and a file-transferring engine.

The use of a symmetric key encryption, relies on the fact that correspondents, who are known to each other can normally secretly agree a shared encryption password, which is then used to encrypt data on the desktop of the sender and to decrypt it on the desktop of the recipient, with no possibility of it being decrypted by an intermediate server administrator. The use of a file-transferring engine allows the transfer of large data files (unlimited in size, even files of 100 megabytes or more).

Suitably, the data encryption and transfer module uses public key encryption and a file-transferring engine.

Preferably, the file-transferring engine is a hypertext transfer protocol (HTTP) engine.

When a HTTP engine is used the system may be accessed through a web-browser using HTTP.

Alternatively, the file-transferring engine is a file transfer protocol (FTP) engine.

A file transfer protocol (FTP) engine is the preferred engine for transmitting large data files. With FTP data transfer very little data is added to the file size during data transfer. It is much less prone to delays than other commonly used protocols.

The file transfer in accordance with the invention operates basically in real time, where one can "see" the data being transferred and know when it has reached its destination. Therefore, the data almost always gets there faster than transfer by e-mail or http.

Transfer of data using FTP also has the advantage that it cannot execute extraneous commands, which might be received from a dangerous virus, a common problem in e-mail systems.

Preferably, the transfer of data can be resumed from a point of breakdown following a line interruption.

Resumption of data transfer from a point of breakdown results in a faster transfer rate when compared to a system, such as e-mail, which must start from scratch again following a line interruption.

Further, preferably, the data encryption and transfer module includes a data compression/decompression function.

Transferring data using the system's FTP results in the addition of approximately 15% to the size of the data being transmitted in the case of a data file of 1 megabyte, due to control and transfer protocols. In contrast a typical e-mail transfer system using SMTP protocol will add 123% to the size of the data being transferred for a 1 megabyte file.

In one embodiment of the system in accordance with the invention, the data transferred by a first user, using the data encryption and transfer module, can be stored on the server computing system such that it can only be accessed by that user.

Thus, a user can remotely store his data for his own use and can access it whenever he wants and wherever he is.

In a further embodiment of the system in accordance with the invention, the data transferred by the first user, using the data encryption and transfer module, can be stored on the server computing system such that it can be accessed and downloaded by a second user, using the data encryption and transfer module in his own user computing system, but is not accessible by another person, except with the first user's permission.

Thus, not only can a user store encrypted data on the server computing system for his own use, but he can also transfer data to the server computing system for subsequent use by a second user. At all times the data is encrypted and the data can be downloaded from the server computing system by moving the data from the window associated with the server computing system to the window associated with the second user's user computing system.

In a further embodiment of the system in accordance with the invention, a first user can create a data file on the server computing system into and out of which data can only be transferred by the first user and other users, designated by the first user.

Such a shared data file would be useful where a project team needs to collate information, discuss it amongst themselves and manipulate it. The information is available to each project member at all times and the transfer of information between project members is at all times secured, as the data is in encrypted form on the server and it can only be decrypted on a local PC, not on the server, which does not have encryption software.

Suitably, the data encryption and transfer module supports the desktop encryption of data on the user computing system.

Thus, all sensitive data can be stored on the user computing system in encrypted form.

If the user wishes to change the password under which existing files are encrypted, the most convenient way is by opening two windows on the desktop, both windows being associated with the user computing system, one being associated with the old password, and the other being associated with the new password. Then it is just a matter of moving the data from one window to the other, the result being that the data is now stored on the user computing system in encrypted form under the new password.

Preferably, the data encryption and transfer module supports the preparation of self-decrypting, self-extracting, executable archives for transfer to non-users of the system.

A self-decrypting, self-extracting, executable archive can be sent to a non-user of the system. It can then be decrypted on the non-user's computer using an agreed password.

Suitably, data in the form of a message can be transferred, optionally attached to a file, the message being encrypted in the same manner as the file.

In contrast to currently available systems, where files are sent as attachments to e-mail messages, the system allows the "attachment" of messages to files as they are being transferred. These messages are encrypted in the same way as the files. This increases the efficiency of file transfer, particularly large files. Thus, instead of attaching a large file to a short message, as in currently available systems, the system can attach the short message to the larger file or send a message separately.

Suitably, the data management module includes the functions of data storage, management and exchange, the storage of public keys/certificates, and an imbedded public key infrastructure (PKI).

Thus, not only is the system compatible with the leading PKI systems, but, where a user does not already use such a system, he may use the system's imbedded PKI facility.

Preferably, the data management module supports secure remote administration of the system including the functions of stopping/running the module, viewing and checking the working parameters, adding or removing users, and changing a user's options.

Further, preferably, the data flow between a remote administrator and the server computing system is encrypted.

Encrypting the data flow is important as it secures the system and minimises interference with the system from an outside source.

Suitably, the data management module provides a document tracking service for the users.

Preferably, the document tracking service includes the automatic sending of an e-mail notification of an uploaded file to the intended recipient, and the automatic sending of an e-mail notification to a sender, when a file has been downloaded by a recipient.

The use of automatic e-mail notifications is an efficient method of keeping the users informed of the status of the data files being both sent from and to them.

Further, preferably, the document tracking service includes the marking of files by the data management module, once they have been downloaded from the server computing system by a recipient.

Thus, if, for some reason, a user is unable to check his e-mails, he can still check to see if an intended recipient has downloaded a file, by checking the file on the server computing system.

Preferably, the data management module will detect when both a user and an intended recipient are connected to the system and will provide the user with the option of sending the data directly to the recipient's computer, without intermediate storage on the server computing system.

The direct transfer of data from user to recipient speeds up the process and also saves the space on the server computing system, which would otherwise have been taken up by the data, until the data was downloaded by the recipient.

Suitably, the data, to be transferred by a user to a recipient's folder on the server computing system, is encrypted using a secret password agreed between the user and the recipient.

An agreed password makes it a straightforward task to transfer data between two users.

Preferably, when a secret password cannot be agreed between a user and a recipient, the encryption and transfer module generates a one-session common secret password by which the data to be transferred is encrypted, the data management module provides the user computing system with the public password of the recipient and the encryption and transfer module encrypts the one-session common password with the public password of the recipient and adds it to the data to be transferred, such that the recipient can subsequently decrypt the data using the one-session secret password.

Thus, where a password has not been agreed between two users the system will still arrange for the PKI encryption and transfer of data.

Suitably, the secret passwords of a user and also the secret passwords shared by a user and his recipients are stored in the password management module operable in the user computing system in encrypted form.

Preferably, the passwords, stored in the password management module, are encrypted with the user's main password and are decrypted when needed, providing a secret key infrastructure (SKI).

The advantage of encrypting all the passwords with the one password is that the user only has to remember that one password to operate the system.

Suitably, the use of digital signatures and standard or imbedded certificates is supported.

The invention also provides a system for the transfer of data from a first location on a computing system to a second location on a computing system comprising, a data encryption and transfer module operable in a user computing system, the transfer of the data between the first location and the second location being effected on the user computing system through use of the data encryption and transfer module, by moving the data from the first location to the second location, each location being associated with a password, such that the step of moving the data from one location to the other causes the data to be encrypted, re-encrypted or decrypted from one associated password to the other.

The transfer of data in this way reduces the number of steps normally required to move and encrypt or re-encrypt the data. Thus, it is easier and faster to use than conventional data transfer and encryption systems.

Preferably, the first and second locations are on the user computing system.

Thus, the system can be used to transfer data between folders on the same hard drive while at the same time encrypting or re-encrypting the data.

Alternatively, the first location is on the user computing system and the second location is on a remote computing system.

Suitably, the user computing system and the remote computing system are part of a local area network.

Alternatively, the user computing system and the remote computing system are connected through the Internet.

Thus, the system can be used for transferring encrypted data across a local area network or the Internet. The data is always in encrypted form during transfer. The encrypting, re-encrypting or decrypting operations are carried out on the user computing system.

BRIEF DESCRIPTION OF DRAWINGS

The invention will be further illustrated by the following description of an embodiment thereof, given by way of example only with reference to the accompanying drawings in which:

FIG. 2a and FIG. 2b illustrate a flowchart summarizing the functionality of the system of FIG. 1 from a user's point of view;

FIG. 4a and FIG. 4b illustrate a flowchart showing the steps of sending and receiving data using the system of FIG. 1.

MODES FOR CARRYING OUT THE INVENTION

The system for the secure transfer of data and data management on the Internet according to the invention has two components, a data encryption and transfer module operable in a user computing system, and a data management module operable in a server computing system, the two components being linked through the Internet. The transfer of data between the user and server computing systems is effected on the user computing system through use of the data encryption and transfer module, by moving the data to or from a first desktop window, associated with the user computing system, from or to a second desktop window, associated with the server computing system, each window being associated with a password, such that the step of moving the data from one window to the other causes the data to be encrypted/re-encrypted from one associated password to the other.

The system also includes a password management module operable in the user computing system for managing the passwords, which are required to be used by a user of the system.

Some of the features of the system may be summarised as follows:

Exchange of (SK (secret/symmetric key)/PK (public key) encrypted) files, folders and messages over the Internet P2P (peer-to-peer) data exchange between any two clients of the system Support for known PKI-s (digital signatures and certificates)

Proprietary imbedded PKI

Storage, management and sharing on an Internet server of (SK-encrypted) files and folders Moving and forwarding remotely stored files Mass distribution of encrypted or non-encrypted data to the system's users or outside users (non-clients)

Transfer of (SK-encrypted) files or messages to non-clients of the system

Remote data storage, management and exchange for standard web-browser users

Real-time data transfer and control of the delivery or retraction of sent data

Encryption of files and folders on the desktop

Files are encrypted during transport and while stored on the remote server(s)

Real power of SK encryption

Real transfer via the Internet of files of any size with on-the-fly compression and resumption from any (if) communications breakpoint.

Clarity for users and technical reliability

Secure remote administration of the data management module.

Figure 1:
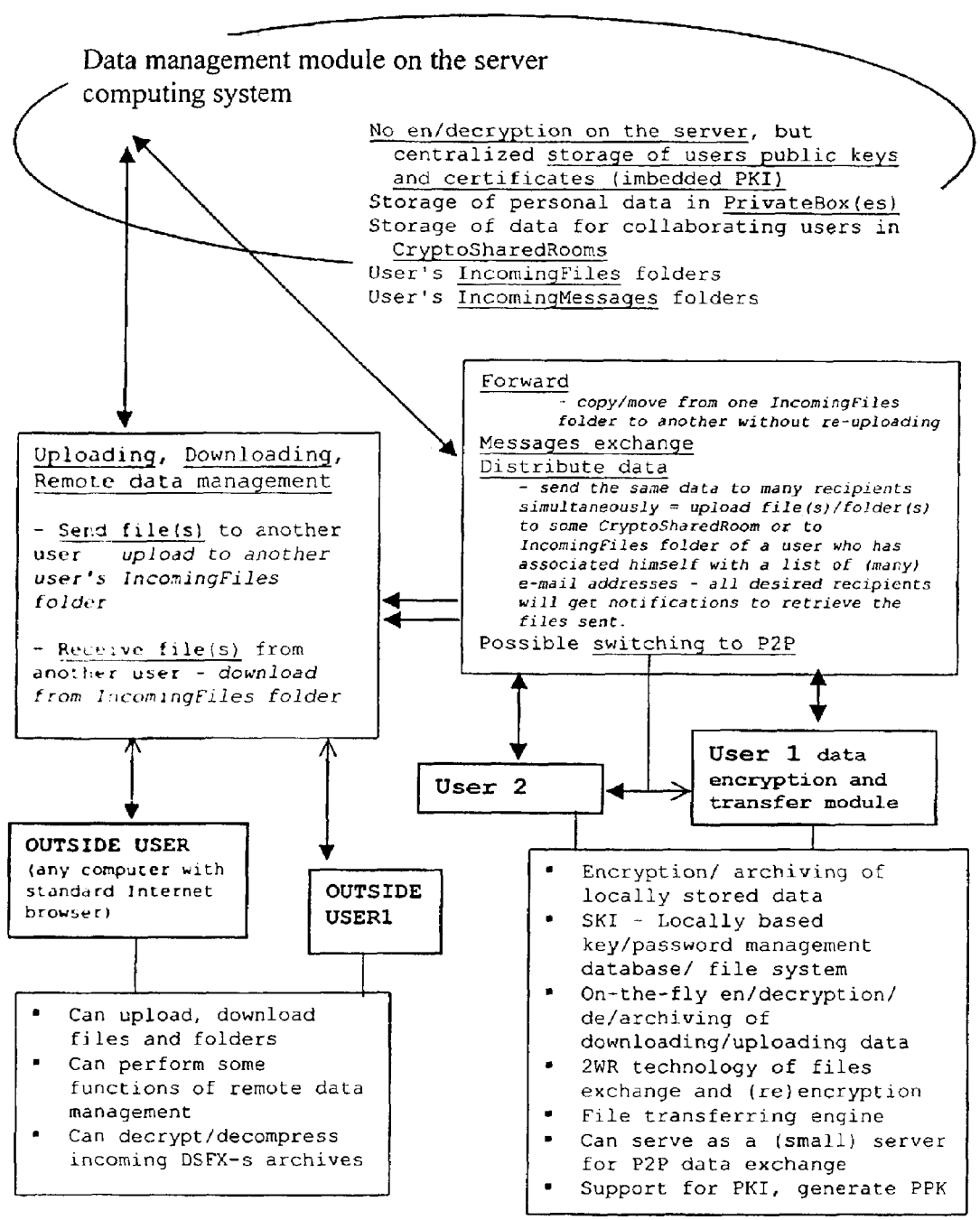
FIG. 1 is a flowchart summarizing the components of a system according to the invention together with some of their functions.

The components of the system together with some of their functions are illustrated in FIG. 1.

The invention is further illustrated in more detail by the following Examples:

EXAMPLE 1

Downloading and Installing the Data Encryption and Transfer Module Software

Figure 2A:
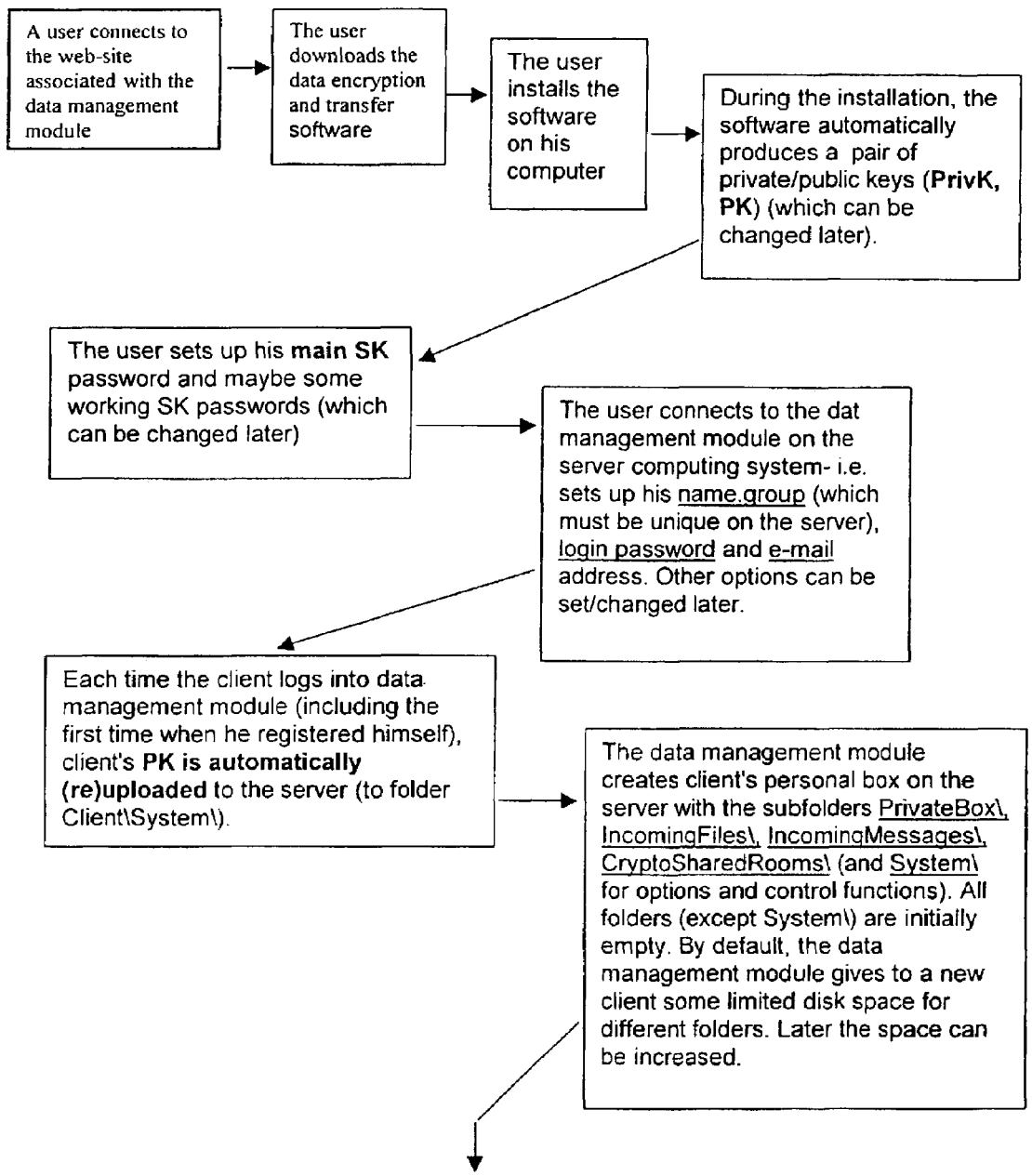

Referring to FIG. 2, for the user, first contact with the system is the downloading and installing of the data encryption and transfer module (client) software.

A user downloads, installs and sets up the client part of the system (data encryption and transfer module) on his PC. During the setup, the data encryption and transfer module automatically produces a pair of private/public keys (PrivK, PK). The user can change his private/public keys whenever he wishes.

The private key is always encrypted by the main symmetric key (SK) of the data encryption and transfer module (for local protection), and this main SK is remembered by the user or written down and stored safely and can be changed by the user at any time. The main SK can be controlled by a Superuser who can read its log files and whose permission is required before changing the SK, as it can be revealed/restored by the Superuser, who could be the Systems Administrator of an organization.

The user may be completely satisfied thereafter merely to operate the data encryption and transfer module as a standalone program, for encryption on his PC or in a LAN, including encryption of e-mail attachments (i.e. encryption of files/folders or preparing encrypted and/or self-extracting archives which can be attached to any e-mail messages). But if he wishes to make more intensive/effective use of the Internet, then he must join some system server (any physical server on the Internet with installed data management module software) as a member/client of that server. He can join any number of different such systems.

Such a server could be, for example, operated by the user's employer as the hub of a secure document transfer and storage system for the organization's staff and their external business partners.

EXAMPLE 2

Registering as a System User/Client

Referring to FIG. 2, the user of the data encryption and transfer module becomes a client of some/any system Server (the data management module). The data management module may be private and for specially qualified people only, for example employees of a particular organisation, in which case the decision to join the system is subject to the permission of that the data management module's Administrator, who will register the clients and give them their login names and login passwords, but not the passwords for data encryption. Alternatively, the data management module may be "public" i.e. for any user of the data encryption and transfer module software, without special eligibility requirements, and in this case the user connects to the data management module and registers himself, inputs/sets up a login name and login password of his own choosing. The owner of the data management module software determines these rules for his own system.

Technically, the user simply presses the system button on his data encryption and transfer module software panel and receives a list of known Internet data management module addresses (such as www.system.com), to which he can connect via his Internet Service Provider (ISP).

In the registration procedure, the data management module (automatically) creates the user's box (folder) with the user's name in a list of/at the same level as all other users:

```
\\the data management module\
    Jim\
    Natalie\
    ...
    Mike\    // <- this subfolder appears at Mike's registration
```

The data management module then stores the hash value of the client's login password for later authentication purposes; uploads and stores the client's public key (PK) previously (automatically) generated during the data encryption and transfer module installation. In fact, the data encryption and transfer module re-uploads and re-stores the client's PK at each new connection in order to always have the latest version of the user's PK, should he decide to change it. The data encryption and transfer module collects and stores some additional identification information from the client, such as full name, e-mail address, etc., and creates the client's infrastructure, a group of technical configuration files and special predefined folders, on the server.

The client's (Mike's) infrastructure on the server includes the following folders and files:

```
Mike\                        // "Mike" is client's login name
    .System\                 // folder with system settings
        .hash_of_loginpsw    // file with the hash of user's system-login password
        .user.dat            // file with users settings/options
        .system.dat          // file with system/administrators settings
        .pk                  // file with user's public key
        .log.dat             // journal/ log-protocol of all events
    .PrivateBox\             // folder with any user-created subfolders possible
    .IncomingMessages\       // folder without subfolders
    .IncomingFiles\          // folder with special subfolders
    .CryptoSharedRooms\      // folder with special subfolders
```

All clients of the data management module have the same structure of folders.

Note 1. Mike can see everything in his folder Mike\ and navigate there as he wishes, and he can download and read any file from Mike\ folder and its subfolders.

Note 2. The folders and files names starting with a dot ".", above, are pre-defined by the system and cannot be changed by any user or the system Administrator.

EXAMPLE 3

Working as a System User/Client

Each time a user connects/logs into the data management module, the data encryption and transfer module opens two windows for him on his PC screen. The left/Local (L) window represents his local computer (any folder on it), and the right/Remote (R) window is located to the source folder of the user on the system server (\\the data management module\Mike\) with the structure of subfolders shown above.

The user can then perform the following actions, as he wishes, under his desktop control:
My Private box (Upload, Download, open sub-folders)
Download/view IncomingFiles
Download/view IncomingMessages My CryptoSharedRooms
  Navigate
  Edit options/list of members
  Delete/Rename/Create new
  Send/distribute files/folders to client or outside users of the system
  Send message to client
  Navigate
  Synchronize a SK with a user
  Send files to a user
  Read log-protocol
  Set/change options
  Create outside client/user Actually, all the functions of the system (except setting options) are performed through simple navigation over the folders of the data management module and trailing (copying/moving) files from the L window to R window, or vice versa, on the local desktop.

EXAMPLE 4

The Transfer of Data in the System

Figure 3:
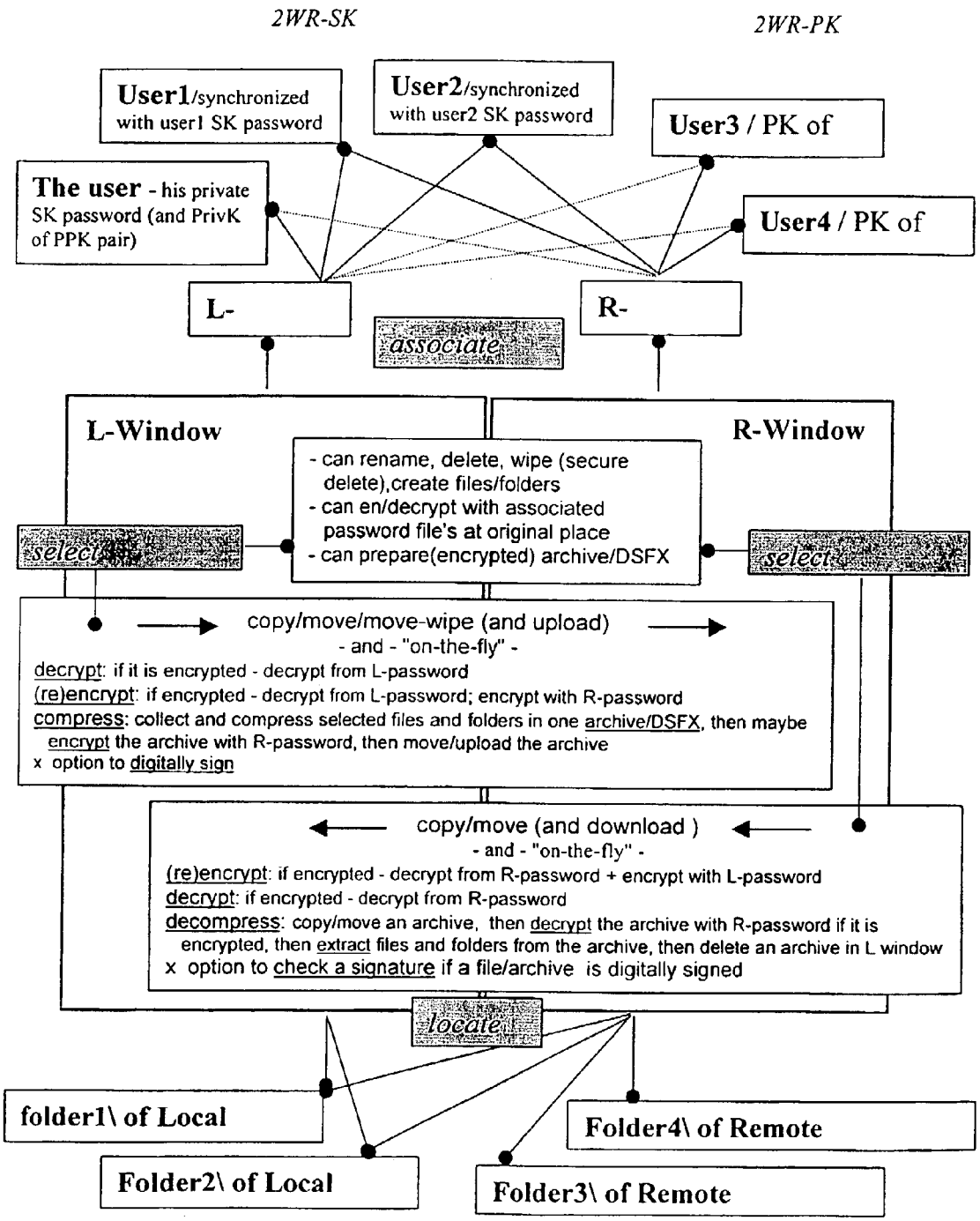
FIG. 3 is a flowchart summarizing the transfer of data between the user and server computing systems using the system of FIG. 1.

Referring to FIG. 3, the transfer of data by moving the data to or from a first desktop window, associated with the user computing system, from or to a second desktop window, associated with the server computing system is hereinafter referred to as two windows (re)encryption technology (2WR technology).

The first job of the 2WR technology, using secret keys (2WR-SK) is to automate a simple task:

One works with plain-text files on one's local computer and wants to store/save/back them up onto a server in encrypted form, accessible only by oneself.

If it is done manually, one has to
1) Encrypt files with one's SK (secret key/password);
2) Copy the files to the server;
3) Decrypt files with one's SK (to restore the initial configuration).

In 2WR technology (using the data encryption and transfer module), one only needs to "choose user", i.e. oneself with one's SK, when opening the second window, only one time, and then one simply copies files (by trailing their icons or via the menu or buttons panel) as usual from one window to another. The copied files remain in plain text form on the local computer, but are stored in encrypted form on the server and are transferred in encrypted form.

In the case where some files on one's local computer might already be encrypted with one's SK, and one wants to store these in the different location (other window) then, during copying, the 2WR technology automatically recognizes already encrypted files and transports them without further change.

In another case, one may need to store files on a remote computer encrypted not with one's personal regular (never to be revealed) password but with some other secret password, which is common to that person and another user (or users). To do this manually one would have to
1) Decrypt files already encrypted with one's own SK;
2) Encrypt all files with the common SK;
3) Copy files (to the target location);
4) Decrypt the files with the common SK (to restore to the previous configuration);
5) Encrypt the files (which were encrypted before one started) with one's SK (to restore the initial configuration).

In 2WR technology one needs to, just once, set one ("local") window to one's personal SK and the other ("common") window to the common SK. Then one copies files as usual, trailing their icons from one window to the other. When the files must later be copied back from the common window to the local one, the 2WR system works as follows:
1) Copy files;
2) Decrypt them in RAM with common SK;
3) Leave them plain or encrypt them with local SK.

Moves (2) and (3) happen automatically after (1) is made; and whether (3) leaves the files in plain or encrypted form depends on the command choice selected—see below.

Thus, all crypto-operations occur on the local computer, of either the sender or receiver, and files are always transferred in encrypted form.

To supply the varied requirements of data crypto-exchange, the 2WR technology expands the ordinary "copy" and "move" command menu to
  copy+encrypt/decrypt/plain
  move+encrypt/decrypt/plain
  move and wipe(secureDelete)+encrypt/decrypt/plain In the 2WR-SK, the local system (data encryption and transfer module) stores the keys of the local user and the common keys shared between him and his correspondents. One might expect therefore that the local user would have to remember his own key and the common keys shared with all his individual correspondents. However, the data encryption and transfer module, by way of the password management module, stores these agreed common passwords on the local computer in encrypted form, encrypted with the local user's main password, and these are decrypted on-the-fly when needed, as he selects the plain text name of the recipient, so that, in fact, the only password he must actually remember is his own main password. If, using public keys, however, (2WR-PK), the technology will supply the PK of the recipient automatically, so the sender/or his data encryption and transfer module needs only to remember his own secret key. Then, when he copies some files to the remote/common (shared) folder, 2WR automatically does the following:
1) (In the RAM of the computer) it generates a unique one-session common SK;
2) (In the RAM of the computer) it decrypts files already encrypted with the sender's (private) SK;
3) (In the RAM of the computer) encrypts the files with the one-session common SK;
4) (In the RAM of the computer) encrypts the one-session common SK with the public key of the target user and adds it to each encrypted file;
5) By the user's option, the file (encrypted or plain) can be digitally signed by using the user's PrivK.
6) Copies the files over.

The same SK and PPK 2WR technologies can also be used when one does not have an explicit connection to the remote computer/user, but uses some indirect file exchange by any other means, for example, e-mail. The second window allows one to choose a user/subscriber and to (re)encrypt data (from a folder of one's local computer) for him, with his common-secret or public key. Then these (re)encrypted files can be sent by e-mail, for example.

Note. Normally, two windows (re)encryption implies two (or more) real visible windows (where each window is associated with a different user/password), but the technology applies in even one window or any number, the essence of the technology being that it operates with several (e.g. two) different locations (folders) associated with several (e.g. two) different users/passwords. And in a trivial case one can have the same user/password for different windows, as well as one window (one location) for different users.

The two windows (re)encryption technology (2WR technology) is summarized in FIG. 3.

EXAMPLE 5

Sending Files in the System

Let us assume client Jim-Sender wants to send to client Mike-Recipient some files.

Jim-Sender connects to the data management module via his data encryption and transfer module (FTP connection with windows-style interface).

In his R window, Jim-Sender first arrives at his home folder \\the data management module\Jim\ (with subfolders PrivateBox\, IncomingFiles\, etc).

Jim-Sender navigates one level/folder up (to \\the data management module\ folder) and arrives at the list of the system clients/members of this data management module/server: Jim, Natalie, . . . Mike (each client is a subfolder of \\the data management module\).

Note. Some clients can (elect to) be invisible for Jim, and therefore will not appear in the scrolling list, but it is possible for Jim-Sender to specify the name of the recipient directly by typing it into a search system (if he knows the name).

Jim-Sender navigates to the Mike-Recipient folder. The file structure which he sees is:

```
\\the data management module\Mike\
    .IncomingMessages\
    .IncomingFiles\
    .CryptoSharedRooms\
```

Jim-Sender does not have access to other folders in Mike's home folder

Note. Some clients can be inaccessible for Jim-Sender, if they choose to be.

As Jim-Sender arrives in Mike-Recipient's home folder, as represented in Jim's R window, his data encryption and transfer module automatically picks up (downloads) Mike-Recipient's public key (file \\the data management module\Mike\System\PK). This PK will be automatically used for encryption if Jim-Sender and Mike-Recipient have not yet synchronized a symmetric encryption key for data exchange between them.

Jim-Sender navigates \\to the data management module\Mike\IncomingFiles\ folder. The data management module automatically puts Jim-Sender into a subfolder of that one, \\the data management module\Mike\IncomingFiles\Jim-Sender\ folder, which it creates if it does not already exist.

Now Jim-Sender can copy/move any files or folders (with optional "on-the-fly" compression/archiving) from his L window to his R window, i.e. from any folder of his local computer to the \\the data management module\Mike\IncomingFiles\Jim\ folder of the server.

Note 1. If Natalie sends some files to Mike-Recipient, they are stored in another folder—\\the data management module\Mike\IncomingFiles\Natalie\. It will be understood that Natalie has no access to files sent by Jim-Sender, as they are stored in another folder, inaccessible for Natalie), and vice versa.

Note 2. Jim-Sender can also delete some of his previously sent files/archives in the folder \\the data management module\Mike\IncomingFiles\Jim\.

Note 3. Jim-Sender can visit the \\the data management module\Mike\IncomingFiles\Jim\ folder not only for uploading (new) files, but also for checking whether his previously sent files have yet been delivered. If the file is deleted from \\the data management module\Mike\IncomingFiles\Jim\ folder, only Jim-Sender or Mike-Recipient could have deleted it. If Mike-Recipient does not delete a particular file, but downloads it, the data management module automatically sets a special attribute to the file. Thus, Jim-Sender can always know whether his file has been received by Mike-Recipient. Upon delivery, the data management module sends a delivery confirmation to Jim-Sender, by e-mail, naming the file and the recipient.

Each time a user trails (copies/moves) files (and folders) from L window to R, the data encryption and transfer module suggests the following menu:

compress to archive× encrypt archive× prepare $DSFX$(self-decrypted, self-extracted)× delete source files× wipe(secure delete)source files Copy +

(re)encrypt/decrypt/plain Move +

(re)encrypt/decrypt/plain Move &Wipe source +

(re)encrypt/decrypt/plain × Digitally Sign file(s)(option)

The "(Re)encrypt" operation has two choices: SK or PK. If Jim-Sender and Mike-Recipient have a synchronized symmetric password, SK can be chosen. Otherwise Mike-Recipient's public key (automatically generated on Mike-Recipient's local computer and uploaded to/stored on \\the data management module\Mike\System\PK) will be used for encryption. If Jim-Sender's file is already encrypted with Jim-Sender's private secret key, the file will be "on-the-fly" temporarily decrypted in RAM, and then re-encrypted with the shared SK or Mike-Recipient's PK. Anyway, the encryption occurs on Jim-Sender's computer before uploading.

Incidentally, Mike-Recipient's PK, when downloaded for encryption purposes to Jim-Sender's computer, will then be stored there, and checked for any updating before it is automatically used the next time. But, also, Jim-Sender can use it if he ever decides to send Mike-Recipient an encrypted e-mail attachment.

Just before the uploading of files, the data encryption and transfer module prompts Jim-Sender to "attach"/write a message for Mike-Recipient if he wishes, for example to add some explanation/annotation of the files being transferred. In fact, the data encryption and transfer module converts this message to a text file, with the same name as the data file but with a special extension, and uploads it as an additional data file. The "attached" message is encrypted (or not) in the same way as the original data file.

Note. As regards synchronization of symmetric secret keys between Jim-Sender and Mike-Recipient; if Jim-Sender has difficulty in trying to confidentially agree/synchronize a symmetric key for encrypted data exchange with Mike-Recipient, the system provides a procedure for such synchronization by use of Mike-Recipient's public key, which is always present on the the data management module. To do this, Jim-Sender only needs to select Mike-Recipient in the data management module (i.e. to go inside the \\the data management module\Mike\ folder) and click the menu item "system>Synchronize SK with a client" of his data encryption and transfer module software. The data encryption and transfer module prompts Jim-Sender to input any password, or to read it from a file, or to generate this password as a unique random binary file. Then the file with the new SK is encrypted by Mike-Recipient's PK (which is downloaded from \\the data management module\Mike\System\PK file) and uploaded to \\the data management module\Mike\Incoming\Files\Jim\ folder, along with any other transferred file. Then Mike-Recipient can later download this file (the data encryption and transfer module will automatically decrypt it with Mike-Recipient's private key) and set it (import it) as the Mike-Jim synchronized password. Such a synchronization procedure is less secure than real person-to-person confidential delivery of the SK, as it relies on public key technology, but it is more secure than permanent use of the public keys for data encryption, because of the well known general vulnerabilities of PPK/PKI systems (mathematical vulnerability, man-in-the middle and false public keys attacks).

Figure 4A:
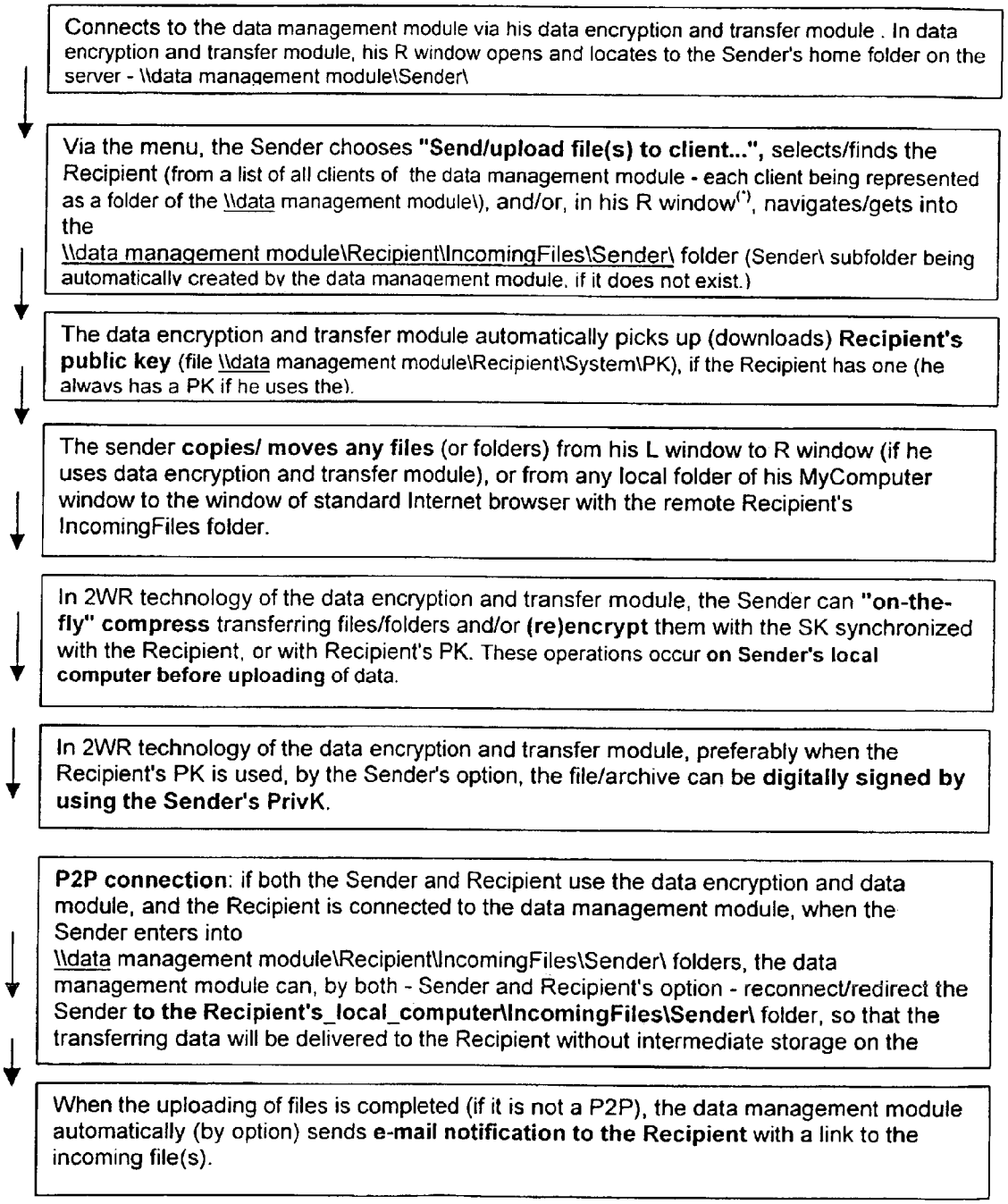

The steps of sending data using the system are summarized in FIG. 4a.

EXAMPLE 6

Reverse Procedure: Receiving Files

If Mike's option of notification of incoming files is set to on, then after Jim sends Mike some files, Mike receives an e-mail which invites him to download www.systemaddress . . . \Mike\IncomingFiles\Jim\somefile To receive/download files which Jim has sent, Mike does the following:
Mike connects to the data management module
In his R window, Mike arrives at his home folder \\the data management module\Mike\ (with subfolders PrivateBox\, IncomingFiles\, etc).
Mike navigates inside his IncomingFiles\ and sees the following:

\\the data management module\Mike\IncomingFiles\
    Jim\
        fileFromJim1
        fileFromJim2
    Natalie\

Now Mike can move/copy any files from his R window to his L, i.e. download files from the server to his local computer. He can also delete any of these files or even entire folders (Jim\, Natalie\, etc).

Each time a user trails (copies/moves) files from his R window to L, his data encryption and transfer module offers the following command menu:

Move + decrypt/ (re)encrypt/ plain / decompress(extract from archive)

Copy + decrypt/ (re)encrypt/ plain / decompress(extract from archive)

Note. If a file is digitally signed, the signature is checking automatically during the decryption,
or L<->R copying/moving the file,
or by separate menu command.

"Decrypt" means here the decryption from the synchronized (Mike-Jim) SK, or decryption with the Private key of Mike, if the file was encrypted with Mike's PK. As in all PPK/PKI systems, the PK actually only encrypts/decrypts a one time randomly chosen SK, with which the file is encrypted, the PK is not used to encrypt the actual file itself, because of speed and other reasons. (Re)encrypt means the same decryption and then encryption by Mike's private/local SK, which he uses for the storage of files on his local computer. In either case, all decryption and encryption occurs only after the downloading, on Mike's local computer.

If Jim's option of notification of delivered files is set to on,—after Mike downloads Jim's file (\\the data management module\Mike\IncomingFiles\Jim\somefile), Jim receives an e-mail notification that the file has been delivered.

The steps of receiving data, using the system, are summarized in FIG. 4b.

EXAMPLE 7

Message Exchange

If Jim only wants to send a message, without files, a special menu option will present him a message template and then everything happens in the same manner as described above, except that his message is uploaded to \\the data management module\Mike\IncomingMessages\ folder, together with other messages, where Jim cannot see or delete them. Each message is a separate text file (encrypted with Mike's PK or sent as plaintext) with a special name constructed from the name of the sender and the time of transfer. For example, "24-12-2000-17-35.[topic.]Jim".

Note. Theoretically, the message can also be encrypted with some synchronized SK, but in practice it is not a convenient/reliable method of message exchange, because normally messages are presented as a linear list of files in one folder, and it is not a good solution to have different files in one folder encrypted with different secret keys. That is one of the reasons why SK encryption is hardly used in e-mail systems.

EXAMPLE 8

Private Box for Remote Crypto-storage and Data Backup

If Mike wants to remotely and absolutely confidentially store his private data, encrypted with his private SK, he must go to his PrivateBox, which is inaccessible to all other users of the system server. In fact, the remote folder \\the data management module\Mike\PrivateBox\ in Mike's R window becomes an extension of his local computer, similar to a mapped drive, as used in local networks, where Mike can copy, store, delete, rename, etc any files and folders.

Each movement/trailing of files and folders from L window to R (uploading) is accompanied by the standard 2WR dialogue, described above—
Compress to archive+encrypt/plain
Copy/Move/Wipe+(re)encrypt/plain/decrypt
to the destination remote folder.
Each trailing of files from R window to L (downloading) occurs as
Move/Copy+decrypt/(re)encrypt/plain/decompress The movement/copying (mouse-trailing) of files from the left to the right, already encrypted with some local password or not, automatically leads to a) temporary "on-the-fly"

decrypting (from the local password) of encrypted files; b) normally—compressing/archiving; c) encrypting with a password for remote storage; and d) uploading.

In reverse: if the client trails a file from the R window to the L—a) the file is downloaded from the remote server; b) normally, it is decrypted from the password used for remote storage; c) normally, it is decompressed/dearchived; and d) and maybe at user's option, it is (re)encrypted with the password for local storage.

Normally, the re-encryption is not necessary for the PrivateBox, because the private SK passwords in L and R locations can be the same.

The other differences between PrivateBox and Incoming-Files operations are:

Any user-defined/-created subfolders are allowed in PrivateBox;

No e-mail notifications are made at uploading/downloading in PrivateBox (Nevertheless, all changes can be found in the client's journal).

EXAMPLE 9

Crypto-Shared Rooms (CSRooms)

Mike can decide to create a folder similar to PrivateBox\ (a remote private crypto-room), but to permit access to it by Jim and Sam, so that any one of them, but not other users, can store and use the data there.

Mike goes into his CryptoSharedRooms\ folder, which is initially empty, and creates there a (sub)folder, for example, Project1\. Then he creates/edits a list/table of CSR-accessibility permissions for this folder, i.e. writes two names in this list, Jim and Sam. Then he establishes an SK password for the folder, maybe simply invents some word (or passphrase), or selects/creates some file, or generates a random "key-file" for use as a password. Mike now has to deliver (tell, give, etc) this SK confidentially to Jim and Sam. If he cannot easily do this, where he sees some security problem in conveying the SK), he can use a special command in the data encryption and transfer module menu: "system>CSR>Synchronize SK (deliver the SK to client)>To all clients specified in the CSR-accessibility table". By this command, Mike's data encryption and transfer module automatically takes (downloads) Jim's PK, encrypts the CSR's SK with this PK and gives (uploads) it to Jim (to \\the data management module\Jim\IncomingFiles\Mike\ folder) as a file. Similarly the SK is conveyed to the other clients of the CSR-accessibility table.

This SK synchronization between any numbers of members of CSRoom happens automatically by one click by the Master of the CSRoom. The Master of a CSRoom is a client who "contains" the room, for example, the Master of CSroom \\the data management module\Mike\CryptoSharedRooms\Project1\ is Mike. The room resides in Mike's infrastructure, probably because it was originally created by him and the Server Administrator agreed to designate him as the master of that room.

In this manner, Mike can create several CSRooms for different projects or purposes and different users. Normally, this activity of creating, editing the accessibility table, later deleting CSR rooms is possible only by permission/option of the data management module Administrator, who declares Mike as a "Master". He is a "Master" in the sense that he is the designated person, who controls the accessibility of the CSRoom and the sharing/synchronizing of the CSR SK password.

When the room Project1\ is created and the SK password is synchronized, both Jim and Sam can visit the folder \\the data management module\Mike\CryptoSharedRooms\, see there the Project1\ room (folder), navigate inside that and work inside there (in their R windows) in the same manner as they would in their own Private boxes, i.e., upload, download, create, delete, copy, rename, move files and folders, subject to Mike's permission. But for any other user, not listed in the CSR-accessibility table, the folder Project1\ in \\the data management module\Mike\CryptoSharedRooms\ is invisible and inaccessible.

Using the pure SK technology, Mike can easily add users to the CSR-accessibility table, without limitation by number. It is impossible to use PK-encryption in such an application because the adding of each new user causes additional encryption and increase in the size of each file stored in the CSR room. To synchronize the SK of the CSR with some new member, Mike can use the same/similar automatic procedure "system>CSR>Synchronize SK (deliver the SK to client)>to selected clients specified in the CSR-accessibility table".

As well as that, Mike can simply delete users from the CSR-accessibility table because a) the deleted user himself has no access to the CSR-accessibility table in order to countermand the deletion; and b) the deleted user can not access the CSR room under any other name because he can not login to the data management module under another login name (as long as he does not know other login passwords).

The list of accessibility (in the example—file \\the data management module\Mike\CryptoSharedRooms\Project1\.csr.txt) has the structure of a table (the CSR-accessibility table) with the fields:

client name/mask (name)
excluded name/mask (noname)
can enter as outside user (O)
can read-download (R)
can upload new (N)
can delete/rename/rewrite-reupload (W)
send notification of uploading to Master (SUM)
send notification of downloading to Master (SDM)
send notification of uploading to other members of CSRoom (SUO)
send notification of downloading to other members of -continued

| | |
|---|---|
| Csroom (SDO) | receive notifications from Master (RM)<br>receive notifications from other members of CSRoom (RO)<br>is the entry enabled or disabled - i.e. |
| deleted/commented (enabled) | |

An example of a structure of a list of accessibility for a CSRoom is given in the following table.

TABLE 1

List of accessibility for a CSRoom

| name enabled | noname | O | R | N | W | SUM | SDM | SUO | SDO | RM | RO |
|---|---|---|---|---|---|---|---|---|---|---|---|
| Jim | | Y | Y | Y | Y | Y | Y | Y | Y | Y | Y |
| Sam | | Y | Y | Y | Y | Y | Y | Y | Y | Y | n |
| *.microsoft | a??.microsoft | Y | Y | Y | n | Y | Y | n | n | Y | n | Y |
| a??.microsoft | | Y | Y | n | n | Y | Y | n | n | Y | n | Y |
| *.* | alex*.* | n | Y | n | n | n | n | n | n | Y | n | Y |

EXAMPLE 10

Encrypted Distribution to System Clients/Members

To send simultaneously the same data—file(s) or (maybe archived) folder(s)—to many recipients who are the clients of the system, Mike has to create a CSRoom, input the names of the recipients in the table of CSR-accessibility permissions for this folder and set On the option "Notifications of uploading to CSRoom (distribution for the data management module clients)" for this room.

Then, the procedure is the same as in previous Examples. All clients of the system mentioned in the table of CSR-accessibility permissions for the CSRoom, will receive e-mail notifications about any file uploaded to the CSRoom, and each of the clients can download files from there.

Mike can also make selective references, to data/files in the CSRoom of interest, to only selected members of the Room. He is not limited to communications with all members at all times. For example, he may wish to refer to (only) some files requiring some editing and, by selecting these files, he can create a message/notification containing that list of files automatically which he can send to selected members.

In a similar manner, Mike can use CSRoom as a place from where anyone, via the web, can pick up a document, once they know the address.

EXAMPLE 11

Sending (Encrypted, Large) Files and Folders to Non-members of the System

Using the system, Mike can send encrypted files and (archived) folders of files not only to other system members, but to any outside person who is not a client of the same data management module and who might not have the data encryption and transfer module or any other decryption (or decompression) software.

To do this, Mike creates some new "outside" client (say, Jane) of the system, i.e., registers Jane as he did previously for himself, marks this client as an "outside client" in "system>system manager>Add/Edit" dialogue of the data encryption and transfer module software, and inputs the e-mail address of Jane in "system>system manager>Jane>Options".

After an outside client Jane is created (registered) on the system, to send data to Jane is absolutely the same as sending data to any other previously registered user/client of the system: Mike has to connect to the system under his name (Mike), choose Jane in the clients' list and upload any files and/or (archived in DSFX (self-decrypting, self-extracting, executable archive) folders.

Other system clients also can send files to Jane, provided Mike has not excluded them from the accessibility list in the Jane folder.

Depending on the options available to Mike or the Administrator, relating to permissions, accessibility lists and deletion conditions of the client Jane, the data management module may automatically delete Jane after she gets her data, or, allow her to continue availing of various communication services, including using a Private box for her private data storage, sending files to other system clients etc.

Normally, files (and folders) being uploaded for Jane are on the fly compressed in a DSFX (self-decrypting, self-extracting executable) archive. Also, normally, Mike would encrypt the files, or the DSFX archive, with a (one-time) SK, and then convey this SK to Jane in a secure manner. He could also use the PK of Jane, if she has one.

Whenever a new file is uploaded by Mike to \\the data management module\Jane\IncomingFiles\Mike\, the data management module automatically sends an e-mail notification to Jane:
Client Mike uploaded new file(s) for you:
file123.4 Mbytes
file2 . . .
at
ftp://Jane:JaneLoginPsw@www.system.address:21/IncomingFiles/Mike/
  just click on this link and then download (copy to disk) the file(s).
(your login name on the system=Jane, login password=JaneLoginPsw)
Depending on the options set by Mike, when he registered Jane on the system, this notification can contain or not contain Jane's login password, and, also, can contain or not contain a password of encryption (SK) in plain form.

If Mike's option of notification of delivered files is set to on,—then after Jane downloads Mike's file, Mike receives an e-mail notification of delivery of the file. Mike can also check (view) \\the data management module\Jane\IncomingFiles\Mike\ folder: all files downloaded by Jane are deleted from there or have a special mark "delivered".

EXAMPLE 12

Encrypted Distribution to a Group of Non-members/Outside Users

To send simultaneously the same data, file(s) or files(s)/folder(s) archived in DSFX form, to many recipients who are not clients of the system and probably do not have the data encryption and transfer module or other decryption or decompressing software, with only one uploading of the data, Mike has to do the same as described above ("Sending (encrypted, large) files and folders to non-members"), and then provide extra addresses in the e-mails list, in the options of a new "outside client".

For example, if Mike has to distribute some information to Paul, Barbara and Jane, he creates/registers a new outside client Jane (the name does not matter), to activate an e-mails list in the options of Jane, and then inputs 3 different e-mail addresses (of each of the recipients) in this list.

Then, everything proceeds as described above.

Note, that Mike can use the same outside client Jane for different purposes, he can edit Jane's options, edit the list of the recipients (e-mails list), change the disk quotas and so on. In fact, Jane does not have to exist. Mike can use his own name, perhaps with a different e-mail address (e-mails list). Mike can select an option to receive a delivery notice for each of the members of this outside group.

EXAMPLE 13

User's Password Management Module: Local Copy of the Data Management Module Structure As described above, the system is mostly an SK-based system, and as is apparent from the description of data exchange and re-encryption, one person/user operating it may have to work, over time, with maybe a hundred or more different secret passwords, and not one of them is stored on the system server. This seems to be impossible, but in fact, the user needs only to remember one "main" password (Mpsw), and maybe not even to remember it, but to securely keep a keyfile containing this password (for example, on a diskette or any other readable media or (special) device). As regards all the other passwords—the user has to input or import them only once, and after that they are remembered and automatically inserted in data encryption or decryption when required. This is achieved because of three technical principles:

1) Representing all the (real, actual working) passwords as files;
2) Encryption of all these files by Mpsw. (The main password is used only for encrypting the other—working—passwords, but not for data encryption, while the working passwords are used for encryption of data files);
3) Dynamic support of the "local copy of the data management module structure".

The simplified logical schema of different secret keys (passwords), which are managed by one (any) local copy of the data encryption and transfer module application is as follows:

| | | |
|---|---|---|
| Data encryption and transfer\ | | //the home/base folder of the data encryption and transfer module software |
| | hash_of_Mpsw | //file for checking the Mpsw |
| | PrivK | //file encrypted by Mpsw |
| | PK | //file encrypted by Mpsw |
| | Wpsw | //local working password encrypted by Mpsw |
| | system\ | //dynamic copy of the data management module |
| example | loginname | //plain file with login name - Mike, in our |
| | loginpassword | //file encrypted by Mpsw |
| | Jim\ | |
| | SK | //SK for Mike<->Jim data encryption, encrypted by Mpsw |
| | Natalie\ | |
| | SK | //SK for Mike<->Natalie data encryption, encrypted by Mpsw |

Once Mike goes into the \\the data management module\Jim\ folder (or into the \\the data management module\Mike\IncomingFiles\Jim\ folder) and inputs an SK for the encryption or decryption of the transferred files, this SK is remembered/stored in Mike's local computer in the data encryption and transfer module\system\Jim\SK file (all necessary folders being created automatically in the background), and encrypted by Mike's Mpsw. It is also possible to input/change or import this password separately using the "password manager" menu item in the data encryption and transfer module software. Next time, when Mike decides to upload files to \\the data management module\Jim\IncomingFiles\Mike\ (or possibly even to the \\the data management module\Jim\IncomingMessages) folder, or to download files from \\the data management module\Mike\IncomingFiles\Jim\ folder, the Mike<->Jim data encryption SK is automatically used by Mike's data encryption and transfer module software which decrypts this key using Mike's Mpsw. Thus, Mike needs to remember only his Mpsw and must input it each time the data encryption and transfer module must perform some encryption or decryption. But, further, this Mpsw can be temporarily remembered by the data encryption and transfer module (in RAM, not on the disk) for a complete session (until exit) or any specified period after Mike inputs it the first time, and all further encryptions and decryptions will be performed "on-the-fly" by the system during that period, without asking Mike to input the Mpsw each time.

The real structure of the data encryption and transfer module passwords is even more powerful and complex: it supports many users at the same level, but with different main passwords, when all these passwords are controlled by one SuperUser password (SUpsw). Any main password controls all the working (real data encryption) passwords of that user. The logical schema of the password system is as follows:

| | | |
|---|---|---|
| \| Data encryption and transfer\ | | //the home/base folder of the data encryption and transfer module software |
| \| | hash_of_SUpsw | //file |
| \| | data encryption and transfer-Users\ | |
| \| | \| User1\ | //users are edited by "User Manager" |

-continued

```
|   | | Mpsw                    //file encrypted by SUpsw
|   | | hash_of_Mpsw            //file for checking the Mpsw
|   | | PrivK                   //file encrypted by Mpsw
|   | | PK                      //file encrypted by Mpsw; this PK is
automatically
|   | |                         //(re)uploaded to the data management
module at each login
|   | | LocalWorkingPasswords\  //psw-s are edited by "Passwords
manager"
|   | | | WpswName1\
|   | | |   Wpsw1               //encrypted by Mpsw
|   | | |   PK1                 //encrypted by Mpsw
|   | | | WpswName2\
|   | | |   Wpsw2               //encrypted by Mpsw
|   | | |   PK2                 //encrypted by Mpsw
|   | | | ...
|   | | | OneTimeWpsw\
|   | | |   OTpsw               //encrypted by Mpsw
|   | | |-
|   | | system\                 //dynamic copy of the data
management module
|   | | | system1\
|   | | | | system-address
|   | | | | loginname           //Mike
|   | | | | loginpassword       //encrypted by Mpsw
|   | | | | Mike\
|   | | | |   PrivateBox\
|   | | | |     SK              //encrypted by Mpsw
|   | | | |   CryptoSharedRooms\
|   | | | |     Project1\
|   | | | |       SK            //encrypted by Mpsw
|   | | | |     Project2\
|   | | | |       ...
|   | | | | Jim\
|   | | | |   identification    //plain file with Jim's id.info
|   | | | |   e-mail            //plain file with Jim's e-mail
address
|   | | | |   SK                //encrypted by Mpsw
|   | | | |   PK                //encrypted by Mpsw
|   | | | |   IncomingFiles\
|   | | | |   CryptoSharedRooms\
|   | | | |     Room1\
|   | | | |       SK            //encrypted by Mpsw
|   | | | |     Room2\
|   | | | |     ...
|   | | | | Natalie\
|   | | | | ...
|   | | | |-
|   | | | system2\              // the same structure as system1
|   | | | | ...
|   | | |-
|   | |-
|   | User2\                    // the same structure as User1
|   | ...
|   |-
```

Different "local" working passwords/symmetric secret keys (the data encryption and transfer module\ . . . \ LocalWorkingPasswords\ . . . \Wpsw1, Wpsw2, . . . ) serve several purposes:

To provide storage of recent/all previously used private secret keys;

To have different keys for different e-mail correspondents, (who may not be members of the data management module)

As keys to be used by different users of the same local computer, or with users of the LAN One of these working passwords is selected by Mike as his default private SK which is normally used in his L window for encryption of his files and folders.

Note. One of the files—Wpsw or PK—in the LocalWorkingPasswords\ is not necessary. The PK is/can be used when SK does not exist (is not synchronized with some other user).

In general, there is no need to keep the system members' public keys on the local (Mike's) computer, such as the data encryption and transfer module\ . . . \system\ . . . \Jim\PK and the data encryption and transfer module\ . . . \system\ . . . \Natalie\PK (Anyway, the data encryption and transfer module actually uses the latest PK-s just downloaded from the data management module, and not from the local "copy" of the data management module). However, maintaining these copies locally allows Mike to check the validity of the public keys of his correspondents. Each time the data encryption and transfer module downloads a PK from the data management module, if this PK is not stored yet in Mike's local "copy" of the data management module, then it is stored there, otherwise the (new) downloaded PK is compared with the (old) stored one, and if these keys do not match, then the data encryption and transfer module alerts Mike: "PK is changed. It is possible that the new PK is not correct! Do you wish to accept the new PK and to store it? (Y/N)"

It can be noted that all folders, which represent "passwords" (or "users/clients"), of any of the four types the data encryption and transfer module\ . . . \LocalWorkingPasswords\WpswName\, the data encryption and transfer module\ . . . \system\ . . . \system-Username\, the data encryption and transfer module\ . . . \system\ . . . \system-Username\PrivateBox\, the data encryption and transfer module\ . . . \system\ . . . \system-Username\CryptoSharedRooms\Room1\ have the same/uniform "structure", and may contain some SK and some PK passwords (one or both files), or neither. All these files are supported by the data encryption and transfer module's "Passwords Manager" utility (a menu item), which permits the creation of a new entry (with SK or PK), or deletion of one of the entries, and to set/change/import/export an SK or PK. Any SK can be input from the keyboard as well as from a file. This enables the use of complicated symmetric passwords. Any SK or PK can be used for any encryption (or decryption) at user's request. Any SK or PK is stored on the local computer in encrypted form, encrypted by the user's main password, Mpsw, and is used by the data encryption and transfer module automatically after the user inputs his Mpsw.

EXAMPLE 14

The System User/Client Authentication (Login Protection) Procedure

Despite the fact that all user's data is/may be stored on the data management module (in PrivateBox\, IncomingFiles\, IncomingMessages\, CryptoSharedRooms\ folders) in encrypted form, and the keys for decryption (symmetric secret keys or the asymmetric private key of the user) are not stored on the system server so that the user's data can not be read by anybody else (other users, the system server administrator, outside attackers), it is important for the system technology to provide strong authentication of the clients and guarantee to each client that no other client of the system or outside attacker can access his private data (not only to read it, but maybe to try to destroy/delete delete files in his folders). The following algorithms provide the required security:

Setup/Change the user's (Mike's) system-login password (during the connection with the data management module):

1. Mike inputs any login password (loginpsw) he wishes, (maybe reads it from a file or generates a unique random keyfile), he does not need to keep it in his memory, the data encryption and transfer module stores this password to the data encryption and transfer module\the data encryption and transfer module-Users\Mike\system\system1\loginpassword file encrypted by Mike's Mpsw, and then will automatically use it when required, after Mike inputs his Mpsw.
2. The data encryption and transfer module (automatically) gets (downloads) the public key (PK-S) of the data management module server.
3. The data encryption and transfer module encrypts the loginpsw with PK-S and then sends (uploads) it to the server.
4. The data management module receives this loginpsw and decrypts it by the data management module's private key (PrivK-S).
5. The data management module calculates the hash value (or control sum) of the loginpsw and stores it in \\the data management module\Mike\System\hash_of_loginpsw file. (The loginpsw cannot be restored from its hash value).

The user's (Mike's) authentication (during login procedure):
1. The data encryption and transfer module decrypts the loginpsw from the data encryption and transfer module\ . . . \system\ . . . \loginpassword file using Mike's Mpsw.
2. The data encryption and transfer module (automatically) gets PK-S from the server.
3. The data encryption and transfer module encrypts loginpsw by PK-S and sends it to the data management module (all copies of the same loginpsw, encrypted by PK-S, are different because each time unique temporary synchromessages/data is used in the encryption).
4. The data management module gets this loginpsw (encrypted by PK-S) and decrypts it with its PrivK-S.
5. The data management module calculates the hash value of the loginpsw—newhash_of_loginpsw.
6. The data management module compares newhash_of_loginpsw with the value stored in the \\the data management module\Mike\System\hash_of_loginpsw file. If they are different, the authentication fails. However, if they are the same, there still remains a danger that a "man-in-the-middle" remembered the loginpsw encrypted by PK-S at stage 3 of a previous authentication and now the data management module receives the same (not loginpsw by itself, but) loginpsw encrypted by PK-S not from the real client, but from the attacker. To prevent this, the authentication procedure continues:
7. The data management module generates a unique synchromessage, and calculates the hash value from the linked synchromessage+loginpsw—S-hash_of_sync+loginpsw.
8. The data management module sends this synchromessage to the data encryption and transfer module.
9. The data encryption and transfer module calculates the hash value from the received synchromessage linked with the loginpsw—C-hash_of_sync+loginpsw—and sends it to the data management module.
10. The data management module compares C-hash_of_sync+loginpsw with S-hash_of_sync+loginpsw. If they are the same, the authentication succeeds, otherwise not.

In other words, the data management module keeps the hash_of_loginpsw, generates unique synchromessage (sync), sends PK-S and sync to the data encryption and transfer module, receives the loginpsw encrypted by PK-S, receives the hash value of sync+loginpsw, and, finally, checks the hash_of_loginpsw and the hash_of_sync+loginpsw.

EXAMPLE 15

User/Client's and Administrator's Options/Settings

Each system client has a set of options, which regulate the characteristics, and performance of the system according to the client's needs. Some of the client's options can be set only by permission of the data management module administrator, for example, the maximum amount of total client's space on the server.

The basic system user/client's settings are:

```
The basic system user/client'ssettings are:
|    system Internet address:      Port: [21]
|    "Outside client" for sending/distribution of data Y/*N
|           "Outside" client(s) can be created only after you create
|           one "true" client on the system, i.e. after you have registered
|           yourself as a client of the system.
|               To send data to an outside client (i.e. a user who is not a
|           system client and probably only uses a standard web browser), you
|           have to a) create an outside client on the system with the "outside
|           client" option set to Y; b) connect to the system under your
|           own name as a "true" client (a "member"); c) choose this created
outside
|           client as any normal destination client and send him data as
|           usual.
|               Outside clients are also used for data distribution,
|           i.e. sending the same data to many recipients: just enter as
|           many e-mail addresses in the options> e-mail list as you
|           need.
|    Client name on the system:      // required option
|    .Group name:                    // required option
|    Login password
|        Set/change/store   View    // change -> ask to connect
|        Login can be set from here only for the registration;
|        otherwise it is used here for the check at login;
|        to change previously set login password - use "Change Login password"
|        during the connection.
|    E-mail(s)
|        // it can be considered as an open/plain additional part of password,
|        // any one of e-mail(s) (if there are several addresses) is sufficient
    for check
```

-continued

```
|        E-mail can be set from here only for the registration;
|        otherwise it is/can be used here for additional check at login;
|        to change previously set e-mail address - goto options.
|            // (this e-mail will be used in delivery notification if "check" is
on)
|     Remote data SK-encryption password (in Private box)
|            Set/change/store View
|     Options (e-mail(s), disk space quotas, accessibility lists, etc)
...
The system user/client's options are:
| E-mail(s)
|     E-mail(,s)                        // required option
|     E-mails list (for data distribution) Y/*N
|            // each string of E-mails list is the same as "E-mail(,s):" option
|            // with the flag on/off
|     Check the e-mail at login if e-mails list is activated Y*/N
|            // (the checked e-mail will be used in delivery notification if
"check" is on)
|
| Client's info
|     Full user's name:                 // required option
|     Corporate/SingleUser  Title  Company Address City  Country  Phone number
|     Public Y/*N   // is it possible for other users to view client's info or
not
|
| Standard access
|     Allow standard ftp/web browser access Y*/N //may be controlled by the
system administrator
|            Standard ftp/web browser login password:
|                Set/change/store   View
|     Suppress use of PPK: Y/*N
|
| Notifications
|     Incoming (uploaded by sender) files notifications: Y*/N
|     Delivered (downloaded by recipient) files notifications: Y*/N
|     Delivered (downloaded by recipient) messages notifications: Y*/N
|     Notification of each downloading: Y/N*
|     Notifications for all addresses in e-mails list Y*/N
|     Notifications of uploading to CSRoom (distribution for system clients):
Y/N*
|     Notification of downloading from CSRoom: Y/N*
|     Y/N Send me last changes in journal each [7] days
|
|     Send standard link for web browser in incoming file notification: Y/N
|     Send system login password in incoming file notification: Y/N
|     Send encryption password in incoming file notification: Y/N
|     Suggest to add any user-defined text in incoming file notification: Y/N*
|     Suppress any advertisement in incoming file notification: Y/N*
|
| Lists of visibility/ accessibility
|     list of clients who can see me in a list of the system clients
|     list of clients who can't see me in a list of the system clients
|     list of clients who can get into my basic folder on the system
|     list of clients who can't get into my basic folder on the system
|
| Automatic deleting
|     Y/N delete client [2] days after all his files are downloaded or deleted
|     Y/N delete client (with all his files) after [45] days
|     Y/N delete client (with all his files) after [30] days of his inactivity
|
| Disk space quotas
|     Max size/ quota of total client's space on the server [10] Mb
|            (by the administrator's decision)
|     Max quotas for different boxes
|         max quota for all PrivateBox\ subfolders [4] Mb
|         max quota for all IncomingFiles\ subfolders [4] Mb
|         max quota for all CryptoSharedRooms\ subfolders [4] Mb
|         max quota for IncomingMessages\ folder [1] Mb
|         max size of Journal: <32> Kb
```

The user/client's options can be set/changed only during/after the connection to the the data management module (the options are stored on the the data management module). Also, during the connection, it is possible to:
| Change Client name on the system (rename)
| Change Group name (rename)
| Change Login password
| Delete client Separately, the data management module administrator configures the characteristics of the general data management module performance and structure (for example, as indicated above—determines whether the system is "private"—only for clients specified by the system administrator himself,—or "public"—for any user of the data encryption and transfer module software which allows the user to register himself as a member of the system without administrator permission) and controls the processes of general maintenance.

The basic the data management module Administrator's options are:
| Administrator registers new client or any new client is acceptable
| Can client(s) create CSRooms or not
| Max days for storing incoming files
| Max days for keeping an inactive client
| Options of automatic deleting of (outside) clients
| Read/set options of client . . .
| Send message to client(s) . . .

EXAMPLE 16

P2P ("Peer-To-Peer") Extension of the System

The two components of the system (the data encryption and transfer module <-> the data management module) comprise a "hybrid P2P (peer-to-peer)" data exchange system, where transferring data moves in P2P form from one client (the data encryption and transfer module) to the server (the data management module), and then from the server to another client, when this other client connects to the server and downloads the data.

Nevertheless, there exists a "pure P2P" variation of the system according to the invention which allows a direct peer-to-peer exchange between two active clients (simultaneously connected to the data management module) of either encrypted or non-encrypted data, without the need to temporarily store the data on the intermediate server. This extension is achieved by a third component of the system, the password management module operable in the user computing system, which is a (simplified) client's variation of the full data management module software on the server computing system, integrated in one package with the client's data encryption and transfer module software, which allows each client to perform some functions of the system server and can transform each discrete client into a ("small") FTP server for any other client.

When client Jim goes to the \\the data management module\Mike\ home folder on the server, the data management module investigates, whether the client Mike is on-line (logged in) or not. If Mike is not logged to the data management module, everything continues in the manner described above: Jim transfers/uploads his files to \\the data management module\Mike\IncomingFiles\Jim\ folder on the system server. But if Mike is logged in to the data management module, the system asks Jim to choose whether he wants to upload the files directly to Mike's local computer, or to the server. If Jim chooses Mike's local computer, the data management module, knowing the (temporary) IP address of Mike's computer, re-connects Jim to the password management component on Mike's computer. Mike's data encryption and transfer module software activates its password management component, and Mike receives files from Jim directly to his data encryption and transfer module\ . . . \system\system1\Jim\IncomingFiles\ folder. Of course, Mike has an option to refuse this direct file transfer if he wishes.

For Jim (sender), the working interface and the principles of data encryption are absolutely the same as when he works with the data management module. As for Mike (recipient), nothing is required from him to get the data from Jim apart from connecting to the data management module.

If Jim decides to connect to some other client (when he goes outside the \\the data management module\Mike\ folder), his data encryption and transfer module automatically reconnects him from Mike's local password management module back to the central data management module. Then he can connect in P2P form with other on-line connected clients, as he wishes.

It is important to note that this technology:
a) Does not allow Jim to receive/download anything (!) from Mike's computer, it works only in one direction Jim->Mike- and thus it is absolutely safe from the point of view of the possibility of stealing any of Mike's personal data;
b) Nevertheless, this technology does not exclude two-direction exchange Jim<-> Mike: Jim connects to the password management module of Mike, and simultaneously Mike can connect to the password management module of Jim and send him any data he wishes;
c) The system's P2P technology is also safe from the point of view of any possible damage to the other person's computer. Jim can upload any files to Mike's computer, but he cannot execute anything on Mike's computer, and none of his uploaded files can be self-executed remotely as flying applets or viruses because the FTP technology, which the system preferably uses, does not allow such things.

The invention claimed is:

1. A system for file management and transfer on a computer network, said network being connected to a plurality of users, comprising:
a data management module (DMM), residing on a server, including separate storage space on the server for each user of the system for uploading, forwarding, downloading and storage of files and messages selectively in encrypted and non-encrypted state, each user's space being divided into a plurality of main directories, including a system folder which keeps the user's settings defined by the system, and user's preferences, selected by the user, and folders for his private box, inbox and shared folders, which can be subdivided by user into many subfolders for storage and management of files to form an online filing system for each user, to define different accessibility rights to different files, a server administrator having control over many management functions including registration and management of users and disk space and services on the server, while each user has control via a range of commands over many functions related to his files and allocated disk space, including compression, decompression, transfer, upload/download, delete, distribution to named groups of members of non-members, creation of arbitrary number of shared folders and access tables for individual shared folders and subdivision of various directories;
a file transfer encryption and transfer module (FTE) residing on the user's computer, providing selection and transfer of files and messages to destinations including destinations on the server, on other computers connected to the network and to outside computers via email based on a local mirroring of part of the data and structure of the DMM onto the user's computer, said FTE also providing selective encryption/decryption of files and messages with passwords exclusively associated and shared with different users, destinations or origins of the file or message, as the user moves the file to a new location so that the file is encrypted/decrypted by a password associated with and shared between the user and the new destination or origin;

a file transfer module residing on the server which works in conjunction with the FTE for transferring data/files;

a password management module residing on the user's computer which is a secure database of the user's password which he and other users have agreed to share, and passwords for other folders on the system or locations on computers outside the system, the password management module being encrypted by a master password known only to the user, wherein the password management module searches users and other passwords according to a defined criteria, selects appropriate passwords for encryption/decryption, provides synchronization of passwords for putting communicating users and provides each user the facility to register, delete, make available for sharing, change and manage his own passwords; and a security system including access controls for login, including store, search and validation of users' login passwords in hash form and controlled by internal access list for shared spaces and security through semi-transparent encryption of files in transit and in storage on the system, to protect file/data residing on the system from unauthorized access, with encryption/decryption occurring on the user's computer to ensure that files are unreadable by any persons not having the encryption password, and/or managed by users exclusively on their computers without any intervention by server administrators or other personal.

2. A system according to claim 1, wherein the FTE uses symmetric key encryption and a file-transferring engine.

3. A system according to claim 2, wherein the file-transferring engine is a hypertext transfer protocol (HTTP) engine.

4. A system according to claim 2, wherein the file-transferring engine is a file transfer protocol (FTP) engine.

5. A system according to claim 4, wherein the transfer of data can be resumed from a point of breakdown following a line interruption.

6. A system according to claim 1, wherein the FTE uses public key encryption and a file-transferring engine.

7. A system according to claim 1, wherein the FTE includes a data compression/decompression function.

8. A system according to claim 1, wherein the file transferred by a first user, using the FTE, can be stored on the server computing system such that it can only be accessed by that user.

9. A system according to claim 1, wherein the file transferred by the first user, using the FTE, can be stored on the server computing system such that it can be accessed and downloaded by a second user, using the FTE in his own user computing system, but is not accessible by another person, except with the first user's permission.

10. A system according to claim 1, wherein a first user can create a folder on the server computing system into and out of which files can only be transferred by the first user and other users, designated by the first user, the folders being available to an access list defined by the user, and associated with an encryption password so that all files posted there will be automatically encrypted and later decrypted with that password and the password is only known to the access list.

11. A system according to claim 1, wherein the FTE supports the desktop encryption of data on the user computing system for storage of encrypted files on the user's computer or transfer of encrypted files to any other computer inside or outside the system.

12. A system according to claim 1, wherein the FTE supports the preparation of self-decrypting, self-extracting, executable archives for transfer to non-users of the system.

13. A system according to claim 1, wherein data in the form of a file can be transferred with the message attached thereto, optionally attached to a file, the message being encrypted in the same manner as the file.

14. A system according to claim 1, wherein the DMM includes the functions of data storage, management and exchange, the storage of public keys/certificates, and an imbedded public key infrastructure (PKI).

15. A system according to claim 14, wherein the DMM supports secure remote administration of the system including the functions of stopping/running the module, viewing and checking the working parameters, adding or removing users, and changing a user's options.

16. A system according to claim 15, wherein the data flow between a remote administrator and the server computing system is encrypted.

17. A system according to claim 15, wherein the data management module provides a document tracking service for the users.

18. A system according to claim 17, wherein the document tracking service includes the automatic sending of an e-mail notification of an uploaded file to the intended recipient, and the automatic sending of an e-mail notification to a sender, when a file has been downloaded by a recipient.

19. A system according to claim 17, wherein the document tracking service includes the marking of files by the DMM, once they have been downloaded from the server computing system by a recipient.

20. A system according to claim 1, wherein the DMM will detect when both a user and an intended recipient are connected to the system and will provide the user with the option of sending the data directly to the recipient's computer, without intermediate storage on the server computing system, and the FTE on each user's computer exchanges files directly between them.

21. A system according to claim 1, herein the data, to be transferred by a user to a recipient's folder on the server computing system, is encrypted using a secret password agreed between the user and the recipient.

22. A system according to claim 21, wherein the secret passwords of a user and also the secret passwords shared by a user and his recipients are stored in the password management module operable in the user computing system in encrypted form.

23. A system according to claim 22, wherein the passwords, stored in the password management module, are encrypted with the user's main password and are decrypted when needed, providing a secret key infrastructure (SKI).

24. A system according to claim 1, wherein, when a secret password cannot be agreed between a user and a recipient, the encryption and transfer module generates a one-session common secret password by which the data to be transferred is encrypted, the DMM provides the user computing system with the public password of the recipient and the encryption and transfer module encrypts the one-session common password with the public password of the recipient and adds it to the data to be transferred, such that the recipient can subsequently decrypt the data using the one-session secret password.

25. A system according to claim 1, wherein the use of digital signatures and standard or imbedded certificates is supported.

26. The system according to claim 1, wherein the computer network is part of a local or wide area network.

27. The system according to claim 1, wherein the computer network is the Internet.

28. The system according to claim 1, wherein files are transferred via communication modes and via other devices which have computing engines.

29. The system according to claim 1, wherein the master password can be revealed or bypassed a super-user password.

30. A system for file management and transfer on a computer network, said network being connected being to a plurality of users, comprising:
   a data management module (DMM), residing on a server, including separate storage space on the server for each user of the system for uploading, forwarding, downloading and storage of files and messages selectively in encrypted and non-encrypted state, each user's space being divided into a plurality of main directories, including a system folder which keeps the user's settings defined by the system, and user's preferences, selected by the user, and folders for his private box, inbox and shared folders, which can be subdivided by user into many subfolders for storage and management of files to form an online filing system for each user to define different accessibility rights to different files, a server administrator having control over many management functions including registration and management of users and disk space and services on the server, while each user has control via a range of commands over many functions related to his files and allocated disk space, including compression, decompression, transfer, upload/download, delete, distribution to named groups of members of non-members, creation of arbitrary number of shared folders and access tables for individual shared folders and subdivision of various directories;
   a file transfer encryption and transfer module (FTE) residing on the user's computer, which provides for selection and transfer of files and messages using a standard web browser for file transfer using HTTP with selective encryption/decryption of files and messages with passwords exclusively associated and shared with different users, destinations or origins of the file or message, as the user moves the file to a new location so that the file is encrypted/decrypted by a password associated with and shared between the user and the new destination or origin;
   a file transfer module residing on the server which works in conjunction with the FTE for transferring data/files;
   a password management module residing on the user's computer which is a secure database of the user's password which he and other users have agreed to share, and passwords for other folders on the system or locations on computers outside the system, the password management module being encrypted by a master password known only to the user, wherein the password management module searches users and other passwords according to a defined criteria, selects appropriate passwords for encryption/decryption, provides synchronization of passwords for putting communicating users and provides each user the facility to register, delete, make available for sharing, change and manage his own passwords; and
   a security system including access controls for login, including store, search and validation of users' login passwords in hash form and controlled by internal access list for shared spaces and security through semi-transparent encryption of files in transit and in storage on the system, to protect file/data residing on the system from unauthorized access, with encryption/decryption occurring on the user's computer to ensure that files are unreadable by any persons not having the encryption password, and/or managed by users exclusively on their computers without any intervention by server administrators or other personal.

31. A system for encrypting files and data for storage on and transfer through a network to which a plurality of users are connected, wherein encryption passwords remain under the exclusive control of the owners of the files which are encrypted, the system using a secret (symmetric) key infrastructure, comprising:
   a password manager for each user residing on his local computer, providing a store for his passwords including passwords associated with and agreed by each pair of users on the network and including any connected computer, or each user and other folder/destination, including his private box and subfolders enabling management of his passwords exclusively by the user, the password manager being encrypted by the user's master password so that when the password manager is opened by the user's entering of the master password, the password manager will automatically select the appropriate working password relevant to the destination or origin of encrypted file;
   the file transfer and encryption module receiving the appropriate password from the password manager, the file transfer and encryption module encrypting/decrypting or re-encrypting for a new destination, a file or other data and transfers or stores it from one location to a second location, when the user moves the file by a simple drag/drop or context menu command;
   wherein passwords are exchanged and agreed between users using public key pairs created for each user by the system or the user's own public key pairs in the absence of other key agreement procedures.

32. A system according to claim 31, wherein the first and second locations are on the user computing system.

33. A system according to claim 31, wherein the first location is on the user computing system and the second location is on a remote computing system.

34. A system according to claim 33, wherein the user computing system and the remote computing system are part of a local area network.

35. A system according to claim 33, wherein the user computing system and the remote computing system are connected through the Internet.

36. The system according to claim 31, wherein files are transferred via communication modes and via other devices which have computing engines.

37. The system according to claim 31, wherein the master password can be revealed or bypassed a super-user password.

38. A system for file management and transfer on a computer network, said network being connected to a plurality of users, comprising:
   a data management module (DMM) residing on a server including separate storage space on the server for each user of the system, each user space being divided into a plurality of main directories, at least one of said main directories including shared folders;

said shared folders being accessible to specific groups of users connected to the network, having access to a shared folder being determined by passwords which are agreed by the users associated with the shared folder.

* * * * *